United States Patent [19]

Shultz

[11] Patent Number: 4,525,945

[45] Date of Patent: Jul. 2, 1985

[54] GALLERY FRAME

[75] Inventor: Julius Shultz, Yonkers, N.Y.

[73] Assignee: Dax Manufacturers Inc., Yonkers, N.Y.

[21] Appl. No.: 568,600

[22] Filed: Jan. 5, 1984

[51] Int. Cl.³ .................. A47G 1/06; G09F 1/12
[52] U.S. Cl. .................................. 40/152; 40/155; 40/152.1; 403/401; 403/402
[58] Field of Search .............. 40/155, 152, 152.1; 248/489, 490, 497; 403/401, 402

[56] References Cited

U.S. PATENT DOCUMENTS 3,811,214  5/1974  Pate ............................. 40/152
3,996,682 12/1976  Schwartz ....................... 40/152

FOREIGN PATENT DOCUMENTS 2831910  2/1980  Fed. Rep. of Germany ...... 248/489

*Primary Examiner*—Robert Peshock
*Assistant Examiner*—Cary E. Stone
*Attorney, Agent, or Firm*—Mandeville & Schweitzer

[57] ABSTRACT

A gallery-quality frame for displaying fine artwork, including four mitered molding sections connected to form a rectangular frame. Each of the molding sections is formed of clear acrylic material and has a solid cross-sectional configuration defining a planar outer side wall, a planar front wall and a planar rear wall generally perpendicular to said side wall, a planar inner side wall, and independent lip, retaining, and assembly flanges projecting inwardly from said inner side wall. Pairs of L-shaped corner joining plates are associated with contiguous end portions of the assembly flanges. The front and rear walls of the molding are highly polished in a manner whereby the sections are transparent from front to rear. The geometry of the sectional frame sections as well as the frosting of their side edges totally conceals the connecting hardware from front view.

4 Claims, 8 Drawing Figures

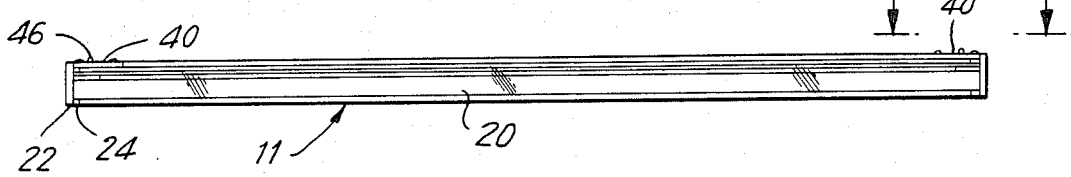
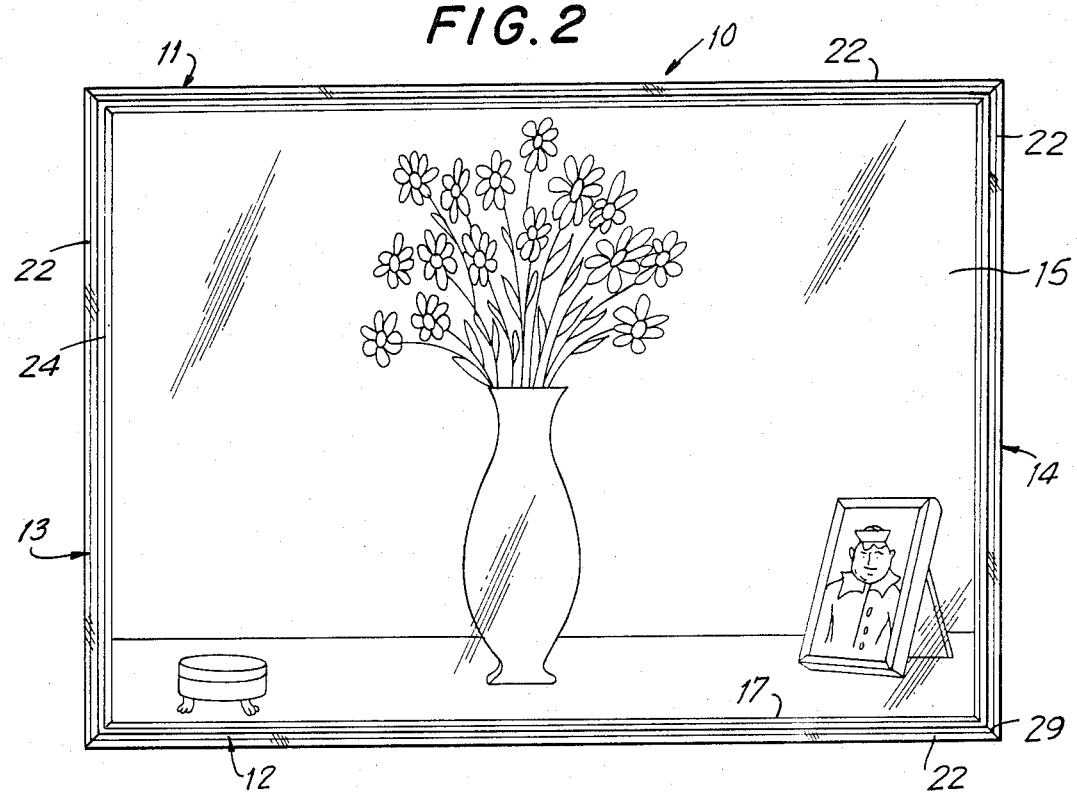
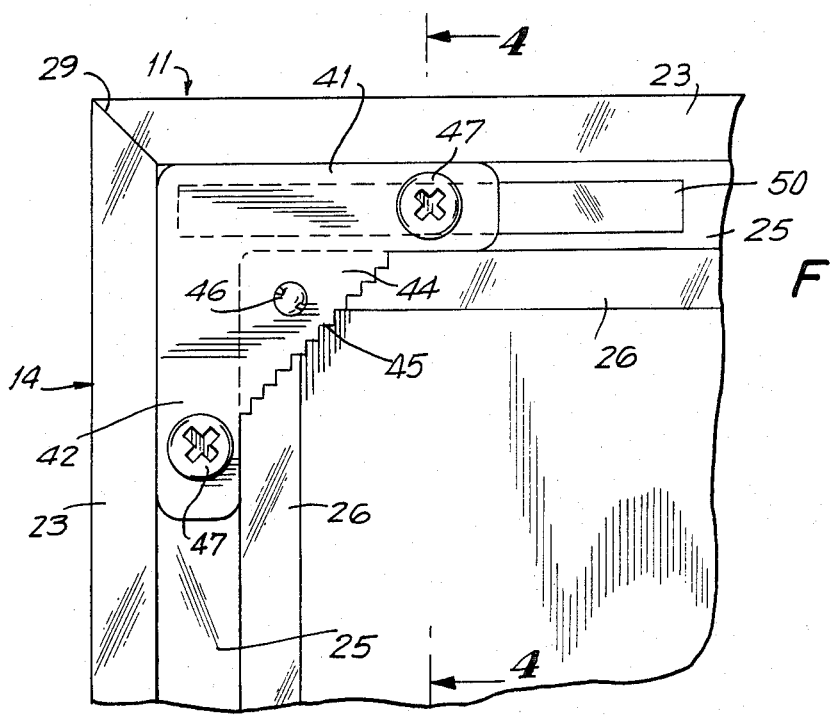

GALLERY FRAME

BACKGROUND OF THE INVENTION

Frame constructions for displaying works of art, photographs, and other graphic works are well-known and typically are assembled from molding formed into rectangular units for holding the artwork and associated mounting materials such as mats, backing boards, and the like, in association with the protective glass cover. Recently, clear plastic frames, e.g. box frames and cubes, have been developed for aesthetically displaying photographs and small prints. These box frames and cubes have been formed from clear plastic material which has been molded or otherwise re-formed into a predetermined parallelipiped structure.

SUMMARY OF THE INVENTION

The present invention is directed to a new and improved gallery frame, i.e. a molding section frame of extremely high quality and extraordinarily attractive appearance designed for use in art galleries, museums, and homes for the display of valuable works of art. More particularly, the new frame is colorless and transparent when viewed from the front so as to provide a new and unusual effect in the framing and display of fine works of art. When viewed from the front, the entire work which is exposed to the viewer may be seen through the transparent front lip flange of the new frame. In addition the wall upon which the new frame is mounted may be observed by virtue of the transparency of the new frame when viewed from the front. The geometry of the sections conceals the corner connecting hardware from view from the front of the frame.

As an important specific aspect of the present invention, the new frame is assembled from four framing sections made of clear acrylic plastic, the front and rear edges of which have been highly polished to provide both an attractive appearance and optical transparency from the front to the rear surfaces of the frame. The side edges of the plastic sections are appropriately frosted in order to conceal, from side view, the mechanical hardware used to join the corners of the sections into the rectangular configuration of the frame.

As a further, more specific aspect of the present invention, the corner assembling hardware used to connect adjacent ends of the frame sections includes features attributing to the ready mountability of the finished frame. Specifically, new corner connectors having serrated edges adapted to rest on hanging nails are provided to connect adjacent edge portions of the sections. The special corner connecting pieces also contain integral rearwardly projecting levelling pins to stabilize the complete frame unit a predetermined distance from the wall upon which the frame is to be hung.

As a still further aspect of the present invention, an alternative means of hanging the frame in the nature of a special eyelet clip has been designed for use in association with the new frame sections. Specifically, the eyelet clip includes an aperture for accepting picture wire. Individual clips may be readily inserted and force fit into grooves integrally formed within the frame sections. Firm locking of the clips in the grooves is achieved through the use of associated wedge plates which may be inserted in the groove along with the clip to firmly lock it in a desired position in the frame assembly.

For a more complete appreciation of the principles of the present invention and a better appreciation of its attendant advantages, reference should be made to the following detailed description of the invention taken in conjunction with the accompanying drawings.

DESCRIPTION OF THE DRAWINGS

FIG. 1 is a top plan view of a new gallery frame incorporating the principles of the present invention;

FIG. 2 is a front elevational view of the new gallery frame;

FIG. 3 is an enlarged rear elevational view of the frame of the present invention showing details of construction;

DETAILED DESCRIPTION OF THE PRESENT INVENTION

Figure 4:
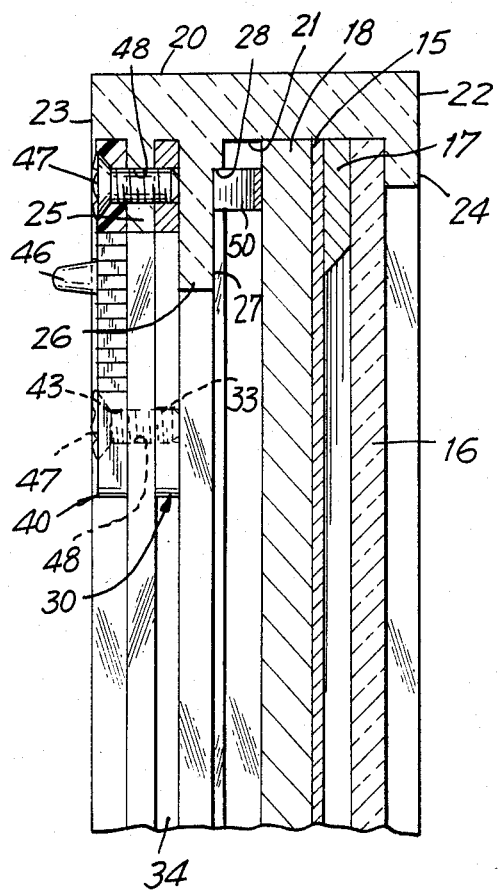
FIG. 4 is an enlarged cross-sectional view taken along lines 4—4 of FIG. 3 showing details of construction and assembly of the new gallery frame.

Referring now to FIG. 2, the new gallery frame 10, generally indicated by numeral, of the present invention is comprised of an upper frame section 11, a lower frame section 12, and side sections 13,14 which are appropriately joined at mitered corners to form a rectangular frame unit. Protectively housed within the frame 10 for display is an appropate work of art 15, which is sandwiched as shown in FIG. 4 between a clear protective glass or plastic cover plate 16, a mat 17 and a mounting or backup board 18, as is conventional in the framing art.

In accordance with the principles of the present invention, the framing sections 11 through 14 are of a special cross-sectional configuration. They are formed by injection molding techniques from clear acrylic plastic and are subsequently cut and mitered to desired lengths. Referring again to FIG. 4, the solid cross section of the framing sections 11 through 14 define an outer side wall wall 20, a parallel inner side wall 21, a front wall 22, and a rear wall 23. Projecting in coplanar relation with the front wall 22 is a transparent lip flange 24. Spaced forwardly of the rear wall 23 is an inwardly projecting assembly flange 25. Between the lip flange 24 and the assembly flange 25 is an inwardly projecting retaining flange 26 which has a stepped surface 27 formed therein terminating in a shoulder 28 which is spaced inwardly of the inner wall surface 21. Assembly holes 48 are drilled in the assembly flanges 25 at predetermined spacing from the ends of each section.

An as important aspect of the invention, the injection molded section front and rear surfaces 22, 23, 24 are highly polished to provide transparency of the sections and lip flanges when viewed from front to rear. The side wall portions 20 are frosted by appropriately sand blasting or otherwise treating the outer edge of the sections to provide a requisite degree of opacity to obscure viewing (from the sides of the frame 10) of the interior hardware utilized in interconnecting the sections into the finished unit.

Figure 5:
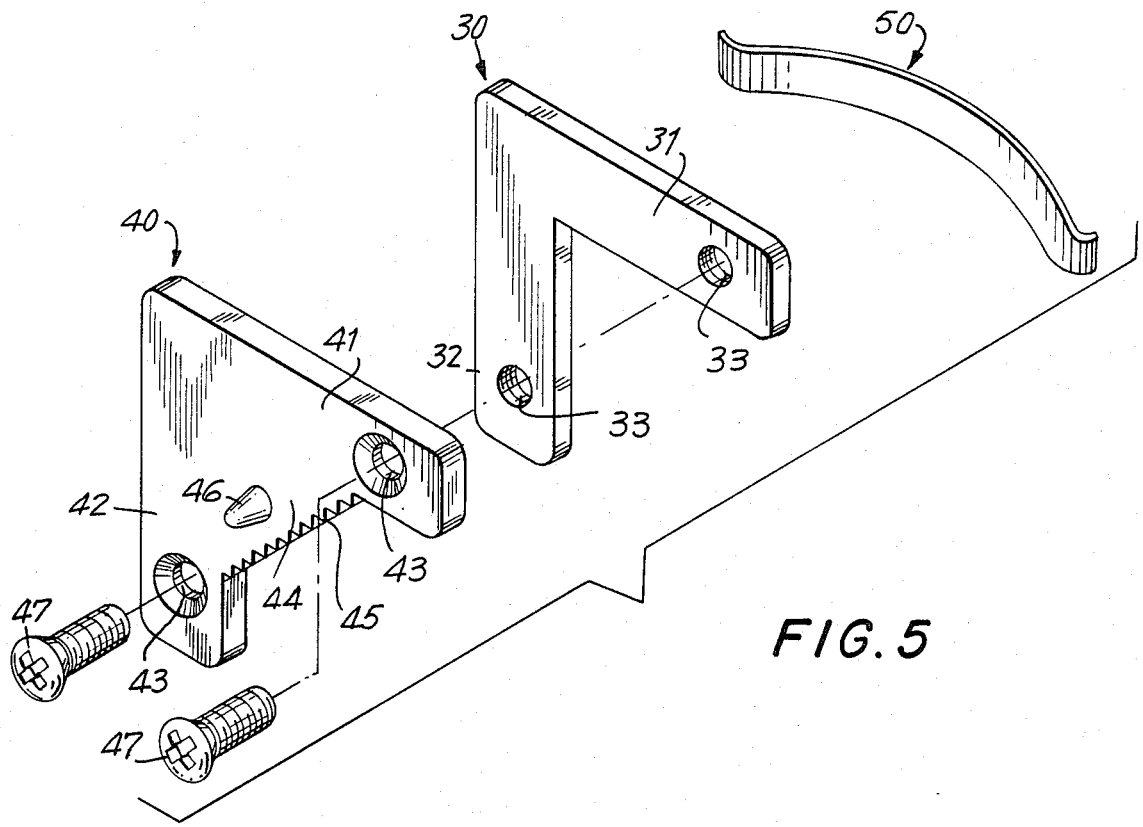
FIG. 5 is an exploded perspective view showing the details of construction of the corner connecting plates and biasing spring means utilized in the practice of the present invention.

More specifically, in accordance with the principles of the invention, the entire assembly of the new and improved gallery frame may be completed quickly and easily. Three consecutive sections (for example, section 11, 13, and 14) are perpendicularly aligned with their mitered end edges 29 in face to face contact. An L-shaped connector plate 30 having perpendicular legs 31,32, each having a threaded hole 33 therein, is inserted in the groove 34 defined between the opposed surfaces of the assembly flange 25 and the retaining flange 26. The outer connecting plate 40 is then juxtaposed over the inner plate 30 with the assembly flange 25 sandwiched therebetween, and with the pre-drilled assembly holes 48 aligned with the holes 33,43 in the plates 30,40 as shown in FIG. 4. The outer connecting plate is generally L-shaped and has perpendicular legs 41 and 42, which include apertures 43 therein as shown in FIG. 5. Advantageously, there is a bridging portion 44, which extends between the legs 41,42 and has a notched or serrated edge 45 formed thereon. In addition, there is a rearwardly projecting integral guide pin 46 associated with the connecting piece 40. The connector 40 may be formed from injection molded plastic whereas the connector 30 may be a standard metallic connector plate of aluminum or steel.

The two initial corners of the frame 10 may then be completed by threading appropriate screws 47 into the two plates 30 and through the appropriately space, pre-formed holes 48 in the assembly flanges 25 as shown in FIG. 4.

At this time the artwork 15 and protective glass or plastic sheet 16 may be inserted into the partially assembled frame by sliding the sheet 16 into the partially assembled frame so that it bears against the inner surface of the lip flange 24 as shown in FIG. 4. The mat 14, the artwork 15, and the backer board 18 may then be inserted between the glass and the retaining flange 26. Thereafter a series of resilient biasing springs 50 of the inverted shallow U-shape generally illustrated in FIG. 5 may be inserted between the mounting board 18 and the surface 27 of the retaining flange 20 to hold the board 18, artwork 15, mat 14, and glass 16 firmly in place against the lip flange 24, as shown in FIG. 4. As a specific aspect of the invention, the side edges of the biasing spring 50 are abutted against the shoulders 28 as shown in FIG. 4 so as not to be visible through the transparent front surfaces 22.

With the glass and the artwork in place, the final section 12 may be assembled to the partially assembled frame by completing the remaining two corners in the manner identical to that described hereinabove and adding springs 50 along that section.

In accordance with the principles of the invention, the completed frame 10 may be readily hung on two nails properly placed in a wall to support the frame at two corners by engaging the serrations 45. The frame will be stabilized and spaced from the wall on which it is mounted by the projecting pins 46 as will be understood.

Figure 7:
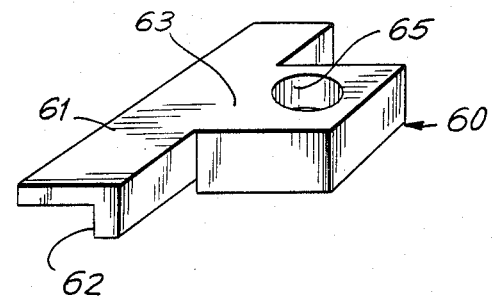
FIG. 7 is a perspective view of a new eyelet member.
Figure 8:
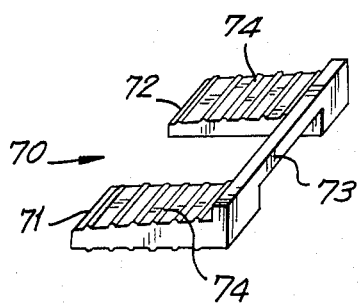
FIG. 8 is a perspective view of a new locking wedge for use in association with the eyelet member.

Alternatively, and as a further specific aspect of the present invention, the frame 10 may be hung from a conventional picture hook through the association of a horizontal picture wire with the rear portions of the frame. To that end, picture wire eyelet hardware may be readily connected to opposite sides of the frame in the following manner. A special wire eyelet 60, shown in FIG. 7, includes an inverted L-shaped connecting clip comprised of legs 61,62. A plate portion 63 projects from leg 62 and has a wire eyelet 65 formed therein. The clip leg 61 is inserted in groove 34 and over the assembly flange 25 as shon in FIG. 6. The eyelet clip 60 may moved along the flange 25 into a desired position and then firmly secured in place by the insertion therein of a wedge-locking member 70, shown in FIG. 8. The locking member 70 is comprised of spaced pair of tapered wedge legs 71,72 having ribs 74 formed thereon, which legs 71,72 are interconnected by an elongated handle portion 73. As shown the wedge lock 70 may be inserted over the eyelet plate 60 in a manner whereby the wedge legs 71,72 are disposed in the groove 34, firmly wedging the leg 61 against the assembly flange 25 as shown.

Figure 6:
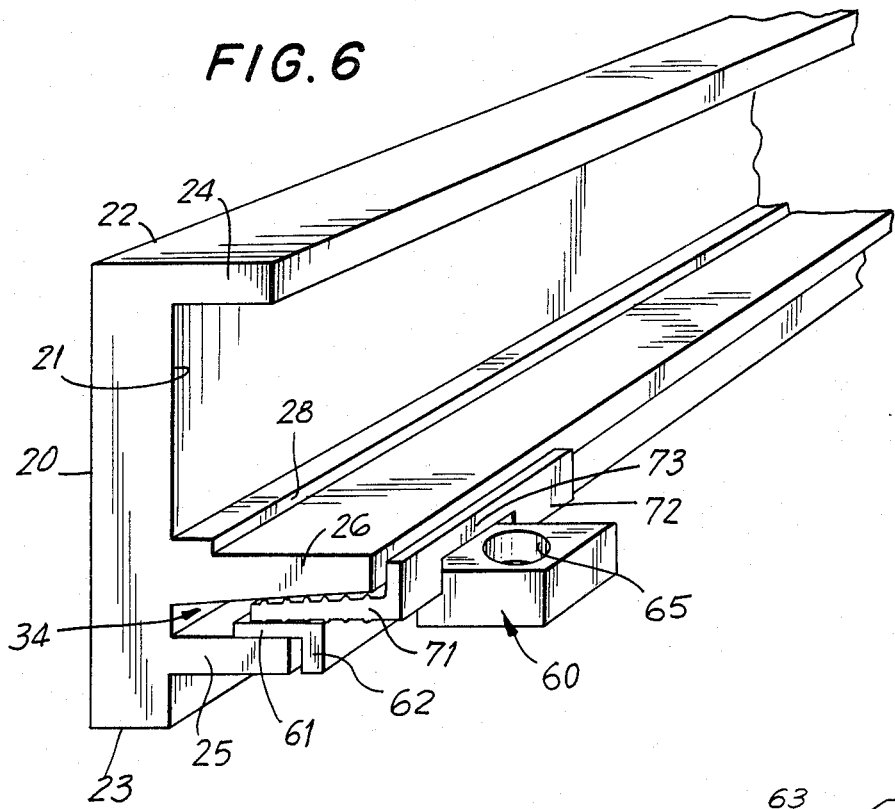
FIG. 6 is a fragmentary perspective view of the new molding section of the present invention with an associated picture wire eyelet.

In the illustration of FIG. 6, the lip flange 24, the retaining flange 26 and the assembly flange 25 as well as the front and rear edges 22,23 are all appropriately slightly tapered to facilitate manufacture by injection molding. It is to be appreciated that injection molding is the preferred method of manufacture of the frame sections for the purposes of maximizing the optical properties thereof, however it is to be understood that the invention encompasses alternative means of manufacture of the frame sections. Similarly, while the connecting hardware elements have been described as being manufactured from particular materials, alternates may be employed without departing from the scope and the spirit of the invention. Indeed, it is to be understood that the specific form of the gallery frame of the present invention and the dimensioning of its component elements have been provided by way of illustration only. The foregoing disclosure is meant to be representative of the principles of the present invention and various changes, may by made therein by those skilled in the art without departing from the clear teachings of the disclosure. Accordingly, reference should be made to the following appended claims to determine the full scope of the present invention.

I claim:
1. A unit for displaying artwork comprising
   (a) four mitered molding sections connected to form a rectangular frame;
   (b) each of said molding sections formed of clear acrylic material and having a solid cross-sectional configuration defining a planar outer side wall, a planar front wall and a planar rear wall generally perpendicular to said outer side wall, a planar inner side wall, and independent lip, retaining, and assembly flanges projecting inwardly from said inner side wall;
   (c) at least one of said side walls of said molding sections is frosted;
   (d) said lip flange is co-planar with said front wall;
   (e) said assembly flange is spaced from said rear wall;
   (f) said retaining flange being disposed between said lip and assembly flanges;
   (g) said retaining flange and said assembly flange defining a hardware groove adapted to receive frame-hanging means;
   (h) said retaining flange including a recessed portion terminating in an abutment shoulder spaced inwardly of said inner side wall;
   (i) corner joining means associated with consecutive end portions of said assembly flanges;
   (j) said corner joining means comprising spaced pairs of generally L-shaped connecting plates, each of which pairs of plates straddles said assembly flange;
(k) screw means fastening said plates to one another and rigidly clamping said assembly flange therebetween;
(l) said front and rear walls being polished, whereby said sections are tranparent from said front to said rear walls;
(m) a plurality of biasing springs are being disposed along said abutment shoulder for urging artwork forwardly of said retaining flange toward said lip flange; and
(n) a clear planar protecting means being disposed against said lip flange and being resiliently biased by said springs.

2. The display unit of claim 1 in which
(a) the rearmost of each of said L-shaped connecting plates includes perpendicular legs and a bridge plate extending therebetween;
(b) a leveling guide pin projects rearwardly from said bridge plate;
(c) a series of serrations is formed on said bridge plate.

3. The display unit of claim 1 which further includes
(a) hanging means force fitted into said groove;
(b) said hanging means includes an eye-plate means and a wedge plate means; and
(c) said wedge plate means includes an inner tapered end and an outer edge defining a handle.

4. The display unit of claim 1 in which
(a) said biasing springs are steel strips of shallow inverted U-shape.

* * * * *